US006636669B1

(12) United States Patent
Chin et al.

(10) Patent No.: US 6,636,669 B1
(45) Date of Patent: Oct. 21, 2003

(54) NANOPHOTONIC DIRECTIONAL COUPLER DEVICE

(75) Inventors: Mee Koy Chin, Wilmette, IL (US); Seng-Tiong Ho, Wheeling, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/574,835

(22) Filed: May 19, 2000

Related U.S. Application Data
(60) Provisional application No. 60/155,668, filed on Sep. 22, 1999, and provisional application No. 60/135,378, filed on May 21, 1999.

(51) Int. Cl.$^7$ ................................................. G02B 6/26
(52) U.S. Cl. .......................................... 385/42; 385/11
(58) Field of Search .............................. 385/11, 14, 41, 385/42, 129–132

(56) References Cited

U.S. PATENT DOCUMENTS 4,674,829 A * 6/1987 Bulmer et al. ............... 359/900
5,293,439 A    3/1994 Mori et al.

FOREIGN PATENT DOCUMENTS

| EP | 0 465 425 | 1/1992 |
| EP | 0 548 770 | 6/1993 |

OTHER PUBLICATIONS

Weinert C.M.; Three–Dimensional Coupled Mode Method for Simulation of Coupler and Filter Structures, Journal of Lightwave Technology, U.S., IEEE, New York., vol. 10, No. 9, Sep. 1, 1992, pp. 1218–1225.

Takagi A. et al.; Broadband Silica–Based Optical Waveguide Coupler with Asymmetric Structure, Electronics Letter, GB, IEE Stevenage, vol. 26, No. 2, Jan. 18, 1990.

Iraj Najafi S. et al.; Single–Mode Ion–Exchangeed Glass Waveguide Power Dividers, Optical Fiber Communication Conference (OFC), U.S., Washington, IEEE Comp. Soc. Press, vol. Conf. 12, Feb. 6, 198, p. 92.

* cited by examiner

*Primary Examiner*—Rodney Bovernick
*Assistant Examiner*—Sarah U. Song
(74) *Attorney, Agent, or Firm*—Reinhart Boerner Van Deuren S.C.

(57) ABSTRACT

A nanophotonic directional coupler is disclosed for transferring light from one waveguide to a second waveguide. The directional coupler is formed within relatively small dimensional parameters and can be formed to accommodate light signals of both transverse electric (TE) and transverse magnetic (TM) polarizations.

16 Claims, 3 Drawing Sheets

NANOPHOTONIC DIRECTIONAL COUPLER DEVICE

CROSS-REFERENCE TO RELATED APPLICATIONS

This application claims priority to Provisional Patent Application Serial No. 60/135,378, filed on May 21, 1999 and to Provisional Patent Application Serial No. 60/155,668, filed on Sep. 22, 1999.

STATEMENT REGARDING FEDERALLY SPONSORED RESEARCH AND DEVELOPMENT

The present invention was developed under Grant Number: ECS-9502475 provided by the National Science Foundation and Grant Number: DAAH04-95-1-1043 provided by the Advanced Research Project Agency of the Department of Defense. The Government may have certain rights in this invention.

FIELD OF THE INVENTION

The present invention is directed to nanophotonic devices and, more particularly, to nanophotonic directional coupler devices.

BACKGROUND OF INVENTION

Directional couplers transfer light signals from one waveguide to a second waveguide, without any direct contact of the two waveguides. The waveguides can be either photonic wire waveguides, such as that disclosed in U.S. Pat. No. 5,878,070, or photonic well waveguides, such as that disclosed in U.S. Pat. No. 5,790,583. U.S. Pat. Nos. 5,790,583 and 5,878,070 are incorporated by reference herein in their respective entireties. Specifically, energy is transferred from one waveguide to the other waveguide by optical tunneling—a process of coherent coupling between the overlapping evanescent tails of the modes guided in each waveguide. Directional coupling is utilizable in wave division multiplexing (WDM) and dense wave division multiplexing (DWDM) applications, where light signals are selectively multiplexed and demultiplexed as needed.

Directional couplers are known in the prior art, such as lithium niobate couplers. Lithium niobate couplers, however, have a difference between the index of refraction inside of the waveguide and the index of refraction of the medium outside of the waveguide that is on the order of 0.01. As a result, a lithium niobate coupler must be formed to be at least several millimeters in length to achieve an acceptable level of signal transfer (i.e., transmission of the light signal from one waveguide to the other).

Semiconductor directional couplers have also been developed in the prior art which have lengths on the order of several hundred microns. The decrease in length from the lithium niobate designs is achieved due to the use of an index difference of up to 0.1 between the index of refraction of a medium inside the waveguide as compared to the index of refraction of a medium outside of the waveguide. In particular, directional couplers are used in connection with a microcavity resonator, such as that described in copending U.S. patent application Ser. No. 09/574,298, which consists of an oval shaped waveguide with arcuate ends, having small circumferences (typically 5 to 20 $\mu$m), and two very small straight lengths. The straight sections of the oval waveguide are coupled to input and output waveguides, respectively, via essentially directional couplers with variable coupling factors. (The "coupling factor" is the percentage of power that is coupled from the input waveguide into the resonator, and is determined by the length of the straight section and the gap separation.) Furthermore, in applications of resonators, it is desirable to be able to control the polarization content of the light that is coupled from the waveguide into the resonator, and vice versa. Hence, a very compact and polarization-controllable directional coupler is an important and integral part of the microcavity resonator device.

Thus there exists a need in the art for an optical device that overcomes the above-described shortcomings of the prior art.

SUMMARY OF THE INVENTION

A nanophotonic directional coupler device is provided which has a first waveguide and a second waveguide. Each waveguide has a respective input port and output port and coupling portion disposed therebetween. The coupling portion of the first waveguide is separated from the coupling portion of the second waveguide.

Preferably, the directional coupler is formed within the following parameters: a gap is defined between the waveguides that has a width which is less than 0.5 $\mu$m; the width of the waveguides is less than 1 $\mu$m; the length of the coupler (referred to as "coupler length") is less than 50 $\mu$m; and a ratio of the index of refraction inside the waveguides to the index of refraction of the medium (e.g. air) in the gap between the waveguides is greater than 1.5. Additionally, the polarization of the light signal must be taken into consideration to ensure there is the desired level of transfer of the light signal between the waveguides.

It is preferred that symmetry be achieved in the directional coupler design. Specifically, the waveguides are to be identically or substantially identically formed (materials; dimensioning) to enable efficient transfer of the light signal. In a preferred embodiment, the waveguides are photonic well waveguides. On the other hand, if photonic wire waveguides are used, the same height in the core (the active medium through which the light propagates), in addition to the same width, is preferably used for both waveguides to enable efficient transfer of the light signal. Additionally, it is preferred that the height and width dimensions of the core be equal.

The operation of the directional coupler is affected by the polarization of the light signal. For transverse electric (TE) signals, it is preferred that the width of the waveguides be less than 0.25 $\mu$m. As for transverse magnetic (TM) signals, it is preferred that the width of the waveguides be greater than 0.35 $\mu$m. If a directional coupler is designed to accommodate a light signal of a certain polarization, it will not operate efficiently with a signal of a different polarization. For example, if a directional coupler is designed specifically to accommodate a TE light signal (be less than 0.25 $\mu$m), a TM signal will pass through the directional coupler with little or no transfer of signal.

It is possible to form the directional coupler to be polarization independent—i.e., able to transfer light signal of either polarization. To form a "universal" directional coupler which is partly insensitive to polarization, the width of the waveguides may be formed greater than 0.25 $\mu$m and less than 0.35 $\mu$m. However, it should be noted that this "universal" design will not perform as well for each polarization as if the directional coupler was designed specifically for each polarization as described above. Moreover, a true polarization-independent directional coupler can be designed for certain specific parameters wherein the device is formed to transfer light with a transverse electric polarization at substantially the same power factor as light with transverse magnetic polarization. Although this design is limited to the design parameters, it is equally effective for both polarizations.

The above-described parameters affect the performance characteristics of the directional coupler. Theoretically, all of a light signal (100%) can transfer from one waveguide to the other in a directional coupler. Under actual conditions, there are losses and perfect "complete" transfer of signal cannot be achieved. However, the various parameters described above can be adjusted to obtain different degrees of signal transfer.

Accordingly, it is an object of the subject invention to provide an improved directional coupler for transferring a light signal between two waveguides.

An additional object of the subject invention is provide a nanophotonic directional coupler which can be adapted to favor a polarization or be formed substantially polarization independent.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PRESENTLY PREFERRED EMBODIMENTS

Figure 1:
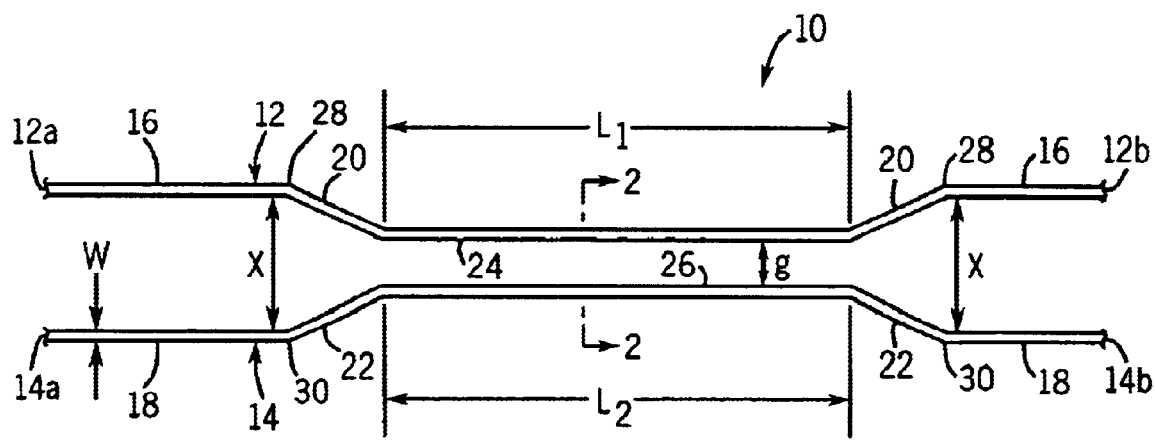
FIG. 1 is a top plan view of a directional coupler formed in accordance with the subject invention.

Referring to FIG. 1, a nanophotonic directional coupler device 10 is generally shown which is defined by two waveguides: an input waveguide 12 and an output waveguide 14. Both waveguides 12, 14 are elongated and formed with input ports 12a, 14a, respectively, and output ports 12b, 14b, respectively. The waveguides 12, 14 are formed to propagate light from one respective port to the other.

Although not shown, the directional coupler device 10 may be formed as part of a semi-conductor device that can be used for light signal management, such as multiplexing and de-multiplexing. The directional coupler device 10 functions to transfer a light signal from one of the waveguides 12, 14 to the other. To illustrate the operation of the invention, by way of non-limiting example, it is assumed herein that a light signal is input through the input port 12a of the input waveguide 12 to be propagated towards the output port 12b, and transferred to the output waveguide 14. Once the light signal is transferred, it will continue to propagate in the same direction as prior to transfer. Thus, in the given example, a transferred light signal will propagate towards the output port 14b of the output waveguide 14. As is readily appreciated, light signals can enter and exit the directional coupler device 10 in various directions, and the terms "input" and "output" are used for convenience.

The waveguides 12, 14 are each formed with transmitting portions 16, 18, respectively, transition portions 20, 22, respectively, and coupling portions 24, 26, respectively. For each of the waveguides 12, 14, the various portions extend continuously to form a unitary waveguide structure.

The coupling portions 24, 26 are disposed to define a gap therebetween having a width g, which is discussed further below. It is preferred that the coupling portions 24, 26 be both substantially straight and that the portions 24, 26 be substantially parallel. Also, the coupling portions 24, 26 have coupler lengths L1, L2, respectively. It is preferred that the coupling lengths L1, L2 be equal.

The transmitting portions 16, 18 are wholly at least spaced apart a distance x, which is greater than the width of the gap g. The transmitting portions 16, 18 carry light signals to and from the directional coupler device 10 and may be formed with various lengths. Additionally, the transmitting portions 16, 18 need not be straight. The key aspect of the transmitting portions 16, 18 is that they be spaced apart a greater distance than the coupling portions 24, 26.

The transition portions 20, 22 extend between and connect the coupling portions 24, 26 with the transmitting portions 16, 18. Specifically, the transition portions 20, 22 extend away from the coupling portions 24, 26 to have respective ends 28, 30 spaced apart by the distance x. By way of non-limiting example, the transition portions 20, 22 and the transmitting portions 16, 18 may be formed straight, with the transmitting portions 16, 18 of the waveguides 12, 14 being parallel. Also, for each of the waveguides 12, 14, the transmitting portions 16, 18 may be collinearly aligned.

The directional coupler device 10 may be formed with various combinations of dimensions. The following is a list of critical parameters for the directional coupler device 10 and their acceptable values.

Gap Width (g)

It is preferred that the gap width g between the coupling portions 24, 26 be less than 0.5 µm. The gap width g required for a specific application is calculated as follows:

$$g = \frac{\lambda}{\sqrt{n_{wg}^2 - n_g^2}}, \qquad \text{Eq. 1}$$

where,

λ is the wavelength of the light signal in free space;

$n_{wg}$ is the index of refraction inside the waveguide; and, $n_g$ is the index of refraction of a medium disposed in the gap.

The light signal that is propagated through the waveguides 12, 14 will often cover a range of wavelengths. In particular, the light signal is generated by a lasing device that pumps the signal at a desired wavelength (typically 1550 nm) or over a range of wavelengths.

Figure 2:
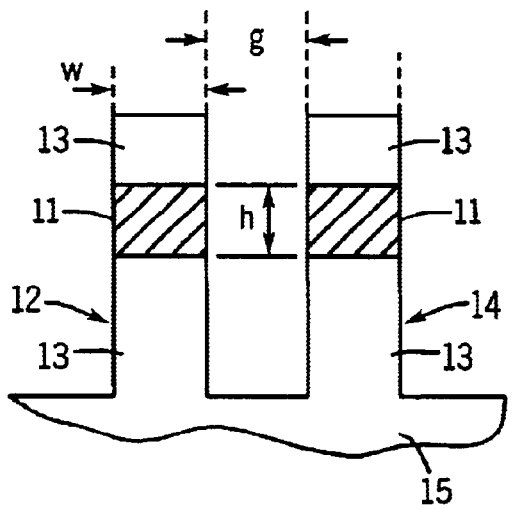
FIG. 2 is a schematic cross-sectional view taken along line 2—2 of FIG. 1.

Referring to FIG. 2, each waveguide 12, 14 includes a core 11 preferably disposed between cladding layers 13. The index of refraction inside the waveguide $n_{wg}$ is the index of refraction of core 11 of the waveguides. The core 11 is the active medium through which the light signal actually propagates. The core 11 may be surrounded by cladding layers 13 and/or substrate 15 and may be formed from Gallium Arsenide or Indium Phosphide; both these materials have an index of refraction that is approximately 3.5. Moreover, it is preferred that deep etching be used to form the waveguides 12, 14. Additionally, the index of refraction $n_g$ refers to the index of refraction of a medium that is disposed in the gap g. Most typically, the medium will be air, having an index of refraction of 1.0. However, other insulative mediums can be used.

Waveguide Width (w)

The waveguides 12, 14 are each formed with a width w that is preferably less than 1 μm. The specific width w is calculated by the following equation, $$W = \lambda/n_{wg} \quad \text{Eq. 2.}$$

Preferably, the two waveguides 12, 14 have the same width w. Additionally, if the waveguides 12, 14 are photonic wire waveguides, then the height h of the core 11 (as shown in FIG. 2) is also preferably made equal between the two waveguides 12, 14. It is also preferred that for photonic wire waveguides, the width w be equal to the height h.

Coupler Length (L1, L2)

As discussed above, the coupler portions 24, 26 of the waveguides 12, 14 are each formed with a respective coupler length L1, L2. Preferably, the coupler lengths L1, L2 are made equal. Additionally, in a preferred embodiment, the coupler lengths L1, L2 are to be less than 50 μm.

Ratio of Indices of Refraction

The ratio of the index of refraction inside the waveguide $n_{wg}$ to the index of refraction of the medium inside the gap $n_g$ is preferably greater than 1.5. Stated simply, $$n_{wg}/n_g > 1.5 \quad \text{Eq. 3.}$$

The large difference in the indices of refraction provides strong confinement of a light signal inside the respective waveguides 12, 14 and provides for a more efficient light signal transfer between the waveguides 12, 14 than that found in the prior art.

Power Factor

The power factor is the indicator of the performance of the directional coupler device 10. The parameters discussed herein have an impact on the power factor. With directional couplers, the term "power factor" is used to indicate what percentage of a signal, assuming no losses, will transfer in a directional coupler. Thus, by varying one or more parameters, a desired power factor can be obtained. Specifically, power factor is calculated by finding a theoretical coupling length ($L_C$) for a specific design at which 100% of the light signal theoretically passes from one waveguide to the other, assuming no losses. The theoretical coupling length may be calculated as follows:

$$L_c = \frac{\lambda}{2(N_S - N_A)}, \quad \text{Eq. 4.}$$

where, $N_S$ is an effective index of refraction for the symmetric mode of the coupled waveguides; and, $N_A$ is an effective index of refraction for the asymmetric mode of the coupled waveguides.

To achieve a theoretical complete transfer in the directional coupling device 10, the theoretical coupling length $L_C$ is solved for, and the coupler lengths L1, L2 are set equal thereto.

The power factor ($F_C$) can be calculated as follows, $$F_C = \sin^2[\pi L/(2L_C)], \quad \text{Eq. 5.}$$

where,

L is the actual coupler length for which the power factor is being calculated.

Thus, the power factor is a function of the actual coupler length and the theoretical coupling length. Theoretically, the power factor equals 1.0 where $L = L_C$—however, a power factor of 1.0 cannot be actually achieved because of losses. It should also be noted that the power factor can be less than one, both at lengths greater than and less than the theoretical coupling length.

Polarization

As discussed above, light signals have either a TM polarization or a TE polarization. As a result, signals of different polarizations behave differently and have different transfer characteristics when used with a directional coupler. For example, the effective indices of refraction $N_S$ and $N_A$ are respectively generally different for TE and TM signals. To take polarization into consideration, a TM specific directional coupler is preferably designed with the additional limitation that the waveguide width w is greater than 0.35 μm. In contrast, a TE specific directional coupler is preferably designed with the additional limitation that the waveguide width w is less than 0.25 μm. It should be noted that a light signal with a TM polarization will not transfer in a TE specific directional coupler, whereas, a light signal with a TE polarization may partially transfer in a TM specific directional coupler. In either case, there is very inefficient or no transfer of signal. Furthermore, the TM specific directional couplers generally have larger coupling lengths that TE specific directional couplers. This means that in order to design a directional coupler that favors a particular polarization, the directional coupler must satisfy a certain combination of waveguide width, gap size and length simultaneously. However, under certain limited circumstances, polarization dependency can be limited or even eliminated. Operationally, a polarization independent directional coupler is one in which both TE and TM polarized lights will transfer equally from one waveguide to the other. In other words, the coupling length for the TE signal ($L_C^{TE}$) is equal to the coupling length for the TM signal ($L_C^{TM}$). Therefore $\Delta L_C$, which is equal to $L_C^{TE} - L_C^{TM}$ is equal to zero for a polarization independent waveguide.

Figure 3:
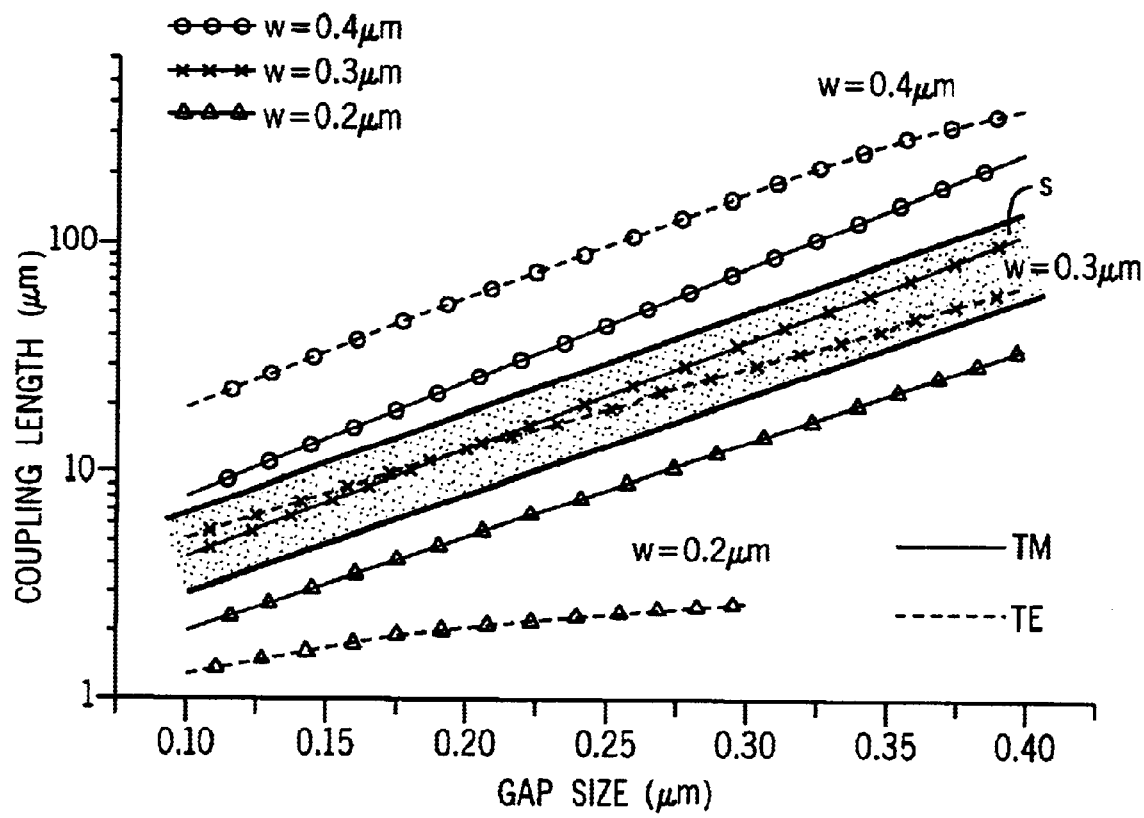
FIG. 3 is a graph showing the relationship of coupling length and gap size at various waveguide widths and with both TE and TM polarizations.

Referring to FIG. 3, two families of curves representing both TE and TM values for different waveguide widths w are plotted as a function of gap size (g). FIG. 3 was prepared with $n_g = 1.0$. A shaded band S represents the range of waveguide widths w of 0.25 μm to 0.35 μm. In this range of w, the coupler lengths are approximately the same for both TE and TM light polarized signals for all gap sizes. In particular, FIG. 3 shows that TE and TM curves for w=0.3 μm cross at a point where the gap size is approximately 0.2 μm. This means that a directional coupler design with the parameters w=0.3 μm and g=0.2 μm will be polarization independent.

For true polarization independence the theoretical coupling length for a TE signal ($L_C^{TE}$) and the theoretical coupling length for a TM signal ($L_C^{TM}$) will be equal for a given set of parameters. Thus, $\Delta L_C$, which is equal to $L_C^{TE} - L_C^{TM}$, is equal to zero for a polarization-independent design.

As an illustrative example, set forth below is Table 1 that includes calculations of $\Delta L_C$ for various indices of refraction inside the gap $n_g$:

TABLE 1

| $n_g$ | $N_S$ (TE) | $N_A$ (TE) | $L_C$ (μm) (TE) | $N_S$ (TM) | $N_A$ (TM) | $L_C$ (μm) (TM) | $\Delta L_C$ (μm) |
|---|---|---|---|---|---|---|---|
| 1.8 | 2.850476 | 2.824245 | 29.545 | 3.010544 | 2.983562 | 28.723 | 0.822 |
| 1.82 | 2.854233 | 2.827389 | 28.871 | 3.011601 | 2.984298 | 28.385 | 0.486 |
| 1.84 | 2.858020 | 2.830557 | 28.220 | 3.012679 | 2.985046 | 28.046 | 0.174 |
| 1.85 | 2.859927 | 2.832148 | 27.899 | 3.013228 | 2.985424 | 27.874 | 0.025 |
| 1.86 | 2.861840 | 2.833747 | 27.587 | 3.013781 | 2.985805 | 27.702 | −0.115 |
| 1.88 | 2.865698 | 2.836963 | 26.971 | 3.014905 | 2.986588 | 27.369 | −0.398 |
| 1.9 | 2.869585 | 2.840206 | 26.379 | 3.016056 | 2.987380 | 27.026 | −0.647 |

Table 1 was prepared with the following parameters: gap width g=0.25 μm; waveguide width w=0.4 μm; optical wavelength λ=1.55 μm; and the index of refraction inside the waveguide $n_{wg}$=3.4.

As shown in Table 1, the values for $\Delta L_C$ switch from positive values to negative values between the $n_g$ values 1.85 and 1.86. Specifically, it has been calculated that $\Delta L_C$ equals zero at $n_g$=1.8516. Thus, true polarization independence is achieved at that point, and Table 2 sets forth the values associated with the point:

TABLE 2

| $n_g$ | $N_S$ (TE) | $N_A$ (TE) | $L_C$ (μm) (TE) | $N_S$ (TM) | $N_A$ (TM) | $L_C$ (μm) (TM) | $\Delta L_C$ (μm) |
|---|---|---|---|---|---|---|---|
| 1.8516 | 2.860233 | 2.832403 | 27.8476 | 3.013316 | 2.985486 | 27.8476 | 0.0000 |

Figure 4:
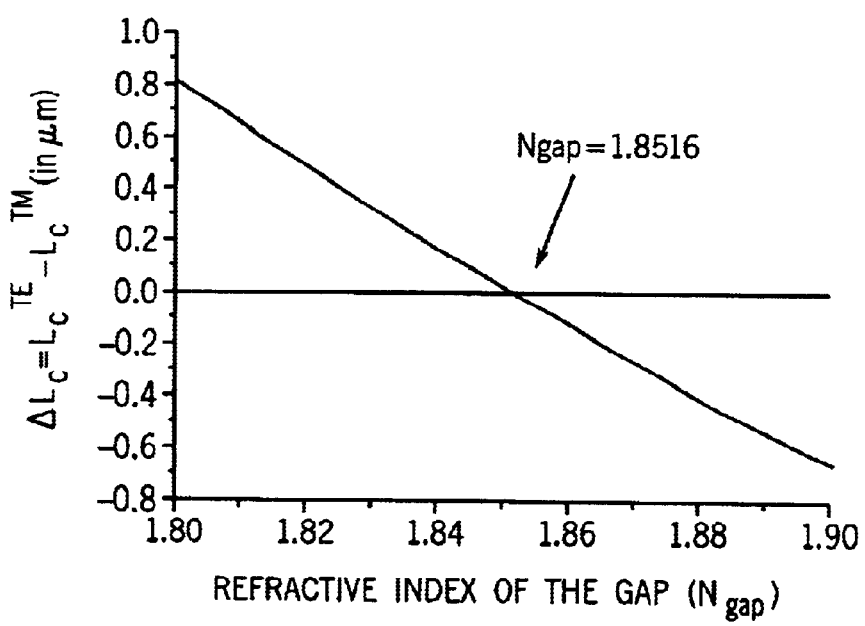
FIG. 4 is a graph showing the relationship between the difference in theoretical coupling lengths for TE and TM signals at a given set of parameters and the refractive index of the gap.

Additionally, FIG. 4 is a graph plotting $\Delta L_C$ versus the refractive index of the gap $n_g$. For $n_g$=1.8516, $\Delta L_C$ equals zero.

As those skilled in the art will recognize, the example set forth above is for illustration, and other points of polarization independence can be achieved by varying the parameters, calculating $N_A$ and $N_S$ for the parameters for both TE and TM signals, and determining $\Delta L_C$. The four primary parameters that effect polarization independence are: the refractive index inside the gap $n_g$; the refractive index inside the waveguide $n_{wg}$; the gap width g; and the waveguide width w. By way of example, Table 3 indicates a second point of polarization independence for different parameters (unless indicated otherwise the same parameters apply as indicated with respect to Table 1).

TABLE 3

| $n_g$ | Gap Width (g) | Waveguide width (w) | $L_C$ (μm) (TE) | $L_C$ (μm) (TM) | $\Delta L_C$ (μm) |
|---|---|---|---|---|---|
| 1.65 | 0.6 | 0.45 | 1655.986 | 1655.986 | 0.00 |

With the foregoing information, the directional coupler device 10 may be designed with numerous dimensional combinations and performance characteristics, even those outside of the range of the preferred embodiment. By way of non-limiting example, reference is made to FIG. 5, which shows gap width g being plotted versus theoretical coupling length ($L_C$) for a waveguide having a width w of 0.4 μm. The plot assumes λ=1.55 μm, and the ratio of the indices of refraction $n_{wg}$, $n_g$ to be greater than 1.5. As indicated on the plot, a TM polarization is also assumed.

Figure 6:
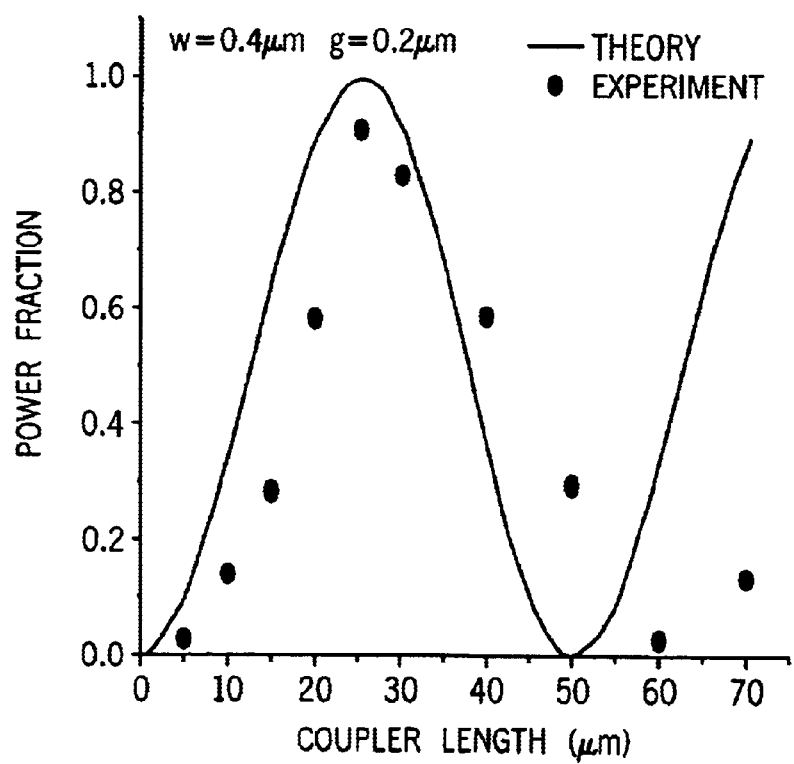

To verify the accuracy of the theoretical coupling length, and determine actual losses, a directional coupler was built with waveguide width w of 0.4 μm and a gap of 0.2 μm. Additionally, the directional coupler was built with λ=1.55, $n_g$=1.5, and $n_{wg}$=3.4. The coupling length was varied and the intensity of the output signal from both the input waveguide and the output waveguide were measured. The measured intensity of the signal outputted from the output waveguide was divided by the intensity of the input signal to calculate the actual power fraction. Referring to FIG. 6, the experimental points indicate test points of the actual power fraction versus the length of the coupler used at that point (actual physical length of directional coupler). The plot of FIG. 6 also includes a curve indicating the theoretical power fraction values over the disclosed range of coupler lengths. As will be noted, the experimental values track the theoretical values fairly well. Note that theoretically the coupling length is the length where the maximum power fraction occurs.

Figure 5:
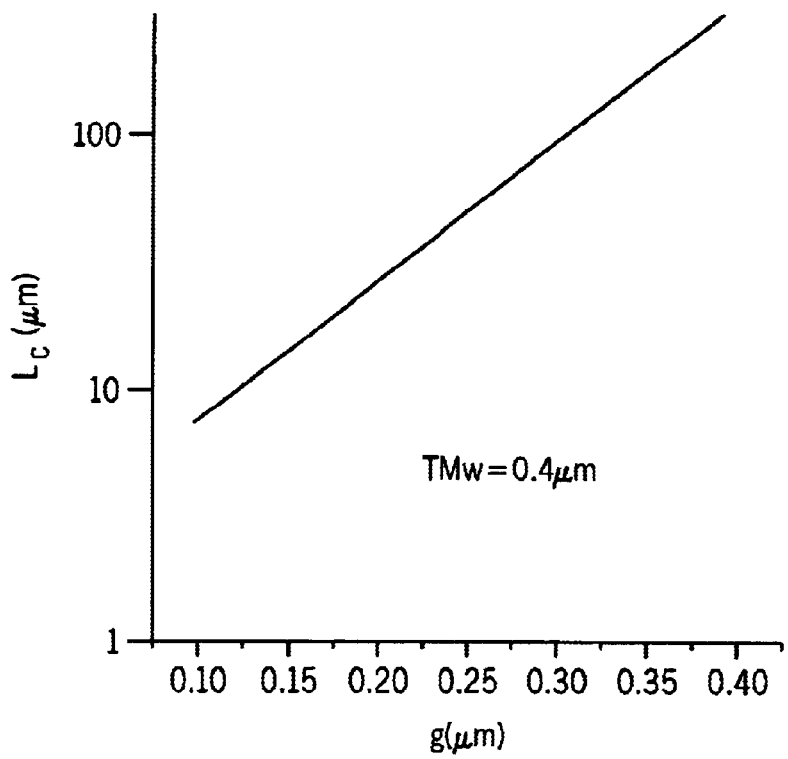
FIG. 5 is a graph showing the relationship between coupling length and gap at various waveguide widths for a directional coupler formed to accommodate a TM light signal; and, FIG. 6 is a graph showing theoretical and experimental relationships of coupler length and power factor for a directional coupler comprising waveguides having a width of 0.4 µm and a gap of 0.2 µm being defined therein.

Referring to FIG. 5, the theoretical coupling length for a gap g of approximately 0.2 μm is approximately 25 μm. Experimentally the maximum power fraction (0.9) occurs at the coupler length of 25 μm, which agrees with the theoretical coupler length. As shown in FIG. 6, with an actual coupling length of 25 μm, the actual power fraction is approximately 0.9 and located at the highest point of the plotted experimental points. Therefore, an actual coupling length of 25 μm for the given parameters provides a substantially complete transfer of energy, wherein a much higher rate of signal transfer is achieved than with other coupling lengths. Accordingly, with the parameters disclosed herein, a directional coupler can be formed having a length less than 50 μm which is capable of achieving substantially complete signal transfer—the range of coupling lengths of the subject invention are much lower than that found in the prior art and defines a substantial improvement thereover.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A directional coupler device for transferring light, said directional coupler device comprising:
   a first waveguide for propagating light therein, said first waveguide extending along a longitudinal axis and having an input port, an output port, and first and second portions defined therebetween; and,
   a second waveguide for propagating light therein, said second waveguide having an output port and first and second portions,
   wherein, said first portion of said first waveguide being spaced a first distance from said first portion of said second waveguide, said second portion of said first waveguide being spaced a second distance from said second portion of said second waveguide, said first distance being less than said second distance, wherein light propagating in said first waveguide from said input port towards said output port transfers from said first portion of said first waveguide to said first portion of said second waveguide and continues to propagate towards said output port of said second waveguide, and wherein said directional coupler device is formed with said first distance being determined as a function of a wavelength of the propagating light, and an index of refraction across said first distance and an index of refraction in at least the first waveguide to transfer light into the second waveguide with transverse electric polarization at substantially the same power factor as light with transverse magnetic polarization, regardless of the polarization characteristic of light propagating in the first waveguide, so that the light propagating in the second waveguide has the same polarization characteristic as light propagating through the first waveguide.

2. A directional coupler device as in claim 1, wherein said first waveguide and said second waveguide are designed with, $\Delta L_C = 0$, where,
   $\Delta L_C$ is the difference between the theoretical coupling length for a transverse electric polarization signal and the theoretical coupling length for a transverse magnetic polarization signal.

3. A directional coupler device as in claim 1, wherein said first distance is less than 0.5 $\mu$m.

4. A directional coupler device as in claim 1, wherein said first portion of said first waveguide defines a width, said width being greater than 0.35 $\mu$m.

5. A directional coupler device as in claim 1, wherein said first portion of said first waveguide defines a width, said width being less than 0.25 $\mu$m.

6. A directional coupler device as in claim 1, wherein said first portion of said first waveguide defines a width, said width being greater than 0.25 $\mu$m and less than 0.35 $\mu$m.

7. A directional coupler device as in claim 1, wherein said first waveguide is formed with a core through which the light propagates, said core having an inner index of refraction, wherein a medium is disposed between said first portion of said first waveguide and said first portion of said second waveguide, said medium having an outer index of refraction, and wherein, the ratio of said inner index of refraction to said outer index of refraction is greater than 1.5.

8. A directional coupler device as in claim 1, wherein said first and second waveguides are substantially identically formed.

9. A directional coupler device as in claim 1, wherein said first portion of said first waveguide is substantially parallel to said first portion of said second waveguide.

10. A directional coupler device as in claim 1, wherein said first portion of said first waveguide and said first portion of said second waveguide are both substantially straight.

11. A polarization independent directional coupler device for transferring light, said directional coupler device comprising:
    a first waveguide for propagating light therein, said first waveguide extending along a longitudinal axis and having an input port, an output port, and first and second portions defined therebetween; and,
    a second waveguide for propagating light therein, said second waveguide having an output port and first and second portions,
    wherein, said first portion of said first waveguide being spaced a first distance from said first portion of said second waveguide, said second portion of said first waveguide being spaced a second distance from said second portion of said second waveguide, said first distance being less than said second distance, wherein light propagating in said first waveguide from said input port towards said output port transfers from said first portion of said first waveguide to said first portion of said second waveguide and continues to propagate towards said output port of said second waveguide, and wherein said first distance is determined as a function of a wavelength of the propagating light, and an index of refraction across said first distance and an index of refraction in at least the first waveguide and is less than 0.5 $\mu$m.

12. A directional coupler device as in claim 11, wherein said first distance equals, $$\frac{\lambda}{\sqrt{n_{wg}^2 - n_g^2}},$$

where,
   $\lambda$ is the median wavelength of the light signal;
   $n_{wg}$ is the index of refraction of a core inside said first waveguide through which the light propagates; and,
   $n_g$ is the index of refraction of a medium disposed between said first portion of said first waveguide and said first portion of said second waveguide.

13. A polarization independent directional coupler device for transferring light, said directional coupler device comprising:
    a first waveguide for propagating light therein, said first waveguide extending along a longitudinal axis and having an input port, an output port, and first and second portions defined therebetween; and,
    a second waveguide for propagating light therein, said second waveguide having an output port and first and second portions,
    wherein, said first portion of said first waveguide being spaced a first distance from said first portion of said second waveguide determined as a function of a wavelength of the propagating light, and an index of refraction across said first distance and an index of refraction in at least the first waveguide, said second portion of said first waveguide being spaced a second distance from said second portion of said second waveguide, said first distance being less than said second distance, wherein light propagating in said first waveguide from said input port towards said output port transfers from said first portion of said first waveguide to said first portion of said second waveguide and continues to propagate towards said output port of said second waveguide, and wherein said first waveguide defines a width in said first portion, said width being greater than 0.25 μm and less than 0.35 μm.

14. A polarization independent directional coupler device for transferring light, said directional coupler device comprising:

- a first waveguide for propagating light therein, said first waveguide extending along a longitudinal axis and having an input port, an output port, and first and second portions defined therebetween; and,
- a second waveguide for propagating light therein, said second waveguide having an output port and first and second portions,
- wherein said first portion of said first waveguide being spaced a first distance from said first portion of said second waveguide determined as a function of a wavelength of the propagating light, and an index of refraction across said first distance and an index of refraction in at least the first waveguide, said second portion of said first waveguide being spaced a second distance from said second portion of said second waveguide, said first distance being less than said second distance, wherein light propagating in said first waveguide from said input port towards said output port transfers from said first portion of said first waveguide to said first portion of said second waveguide and continues to propagate towards said output port of said second waveguide, and wherein said first portion of said first waveguide having a length of less than 50 μm.

15. A polarization independent directional coupler device for transferring light, said directional coupler device comprising:

- a first waveguide for propagating light therein, said first waveguide extending along a longitudinal axis and having an input port, an output port, and first and second portions defined therebetween; and,
- a second waveguide for propagating light therein, said second waveguide having an output port and first and second portions,
- wherein, said first portion of said first waveguide being spaced a first distance from said first portion of said second waveguide determined as a function of a wavelength of the propagating light, and an index of refraction across said first distance and an index of refraction in at least the first waveguide, said second portion of said first waveguide being spaced a second distance from said second portion of said second waveguide, said first distance being less than said second distance, wherein light propagating in said first waveguide from said input port towards said output port transfers from said first portion of said first waveguide to said first portion of said second waveguide and continues to propagate towards said output port of said second waveguide, and wherein said first waveguide defines a width in said first portion, said width being greater than 0.35 μm.

16. A polarization independent directional coupler device for transferring light, said directional coupler device comprising:

- a first waveguide for propagating light therein, said first waveguide extending along a longitudinal axis and having an input port, an output port, and first and second portions defined therebetween; and,
- a second waveguide for propagating light therein, said second waveguide having an output port and first and second portions,
- wherein said first portion of said first waveguide being spaced a first distance from said first portion of said second waveguide determined as a function of a wavelength of the propagating light, and an index of refraction across said first distance and an index of refraction in at least the first waveguide, said second portion of said first waveguide being spaced a second distance from said second portion of said second waveguide, said first distance being less than said second distance, wherein light propagating in said first waveguide from said input port towards said output port transfers from said first portion of said first waveguide to said first portion of said second waveguide and continues to propagate towards said output port of said second waveguide, and wherein said first waveguide defines a width in said first portion, said width being less than 0.25 μm.

* * * * *